(12) United States Patent
Zhang

(10) Patent No.: US 9,608,416 B2
(45) Date of Patent: Mar. 28, 2017

(54) WIRE STRIPPER WITH CLAMPING DEVICE

(71) Applicant: Xiaozhong Zhang, Nashua, NH (US)

(72) Inventor: Xiaozhong Zhang, Nashua, NH (US)

( * ) Notice: Subject to any disclaimer, the term of this patent is extended or adjusted under 35 U.S.C. 154(b) by 286 days.

(21) Appl. No.: 14/328,399

(22) Filed: Jul. 10, 2014

(65) Prior Publication Data
US 2014/0318323 A1   Oct. 30, 2014

(51) Int. Cl.
*H01B 15/00* (2006.01)
*H02G 1/12* (2006.01)

(52) U.S. Cl.
CPC ......... *H02G 1/1265* (2013.01); *H02G 1/1221* (2013.01)

(58) Field of Classification Search
CPC ............................ H02G 1/1265; H02G 1/1221
USPC .......................................... 81/9.51
See application file for complete search history.

(56) References Cited

U.S. PATENT DOCUMENTS

| | | |
|---|---|---|
| 1,661,056 A | 2/1928 | Stack |
| 1,673,196 A | 6/1928 | Johnson et al. |
| 1,725,114 A | 8/1929 | Gelderen |
| 1,881,020 A * | 10/1932 | McFarland ............ B26D 1/24  30/265 |
| 2,239,755 A | 4/1941 | Montgomery |
| D154,715 S | 8/1949 | Sigoda |
| 2,513,262 A | 6/1950 | Carpenter |
| 2,554,126 A | 5/1951 | Schwartz |
| 2,624,317 A | 1/1953 | Murray |
| 2,647,309 A * | 8/1953 | Chisena ............... H02G 1/1217  30/90.9 |
| 2,827,811 A | 3/1958 | Dymeck |
| 3,044,170 A * | 7/1962 | Agombar ............. H02G 1/1202  30/90.9 |
| 3,172,615 A | 3/1965 | Manson |
| 3,309,947 A | 3/1967 | Denney |
| 3,316,781 A * | 5/1967 | Bignell .................... H01B 7/36  81/9.51 |
| 3,535,785 A | 10/1970 | Matthews |
| 3,611,571 A | 10/1971 | Belling |
| 3,624,901 A | 12/1971 | Pattit |
| 3,977,277 A | 8/1976 | Baston et al. |
| 4,083,096 A * | 4/1978 | Baston ................... B23D 23/02  29/403.3 |
| 4,187,745 A | 2/1980 | Lambert |

(Continued)

FOREIGN PATENT DOCUMENTS

GB                722856           2/1955

*Primary Examiner* — Hadi Shakeri
(74) *Attorney, Agent, or Firm* — Maine Cernota & Rardin

(57) ABSTRACT

An insulated wire clamp device as disclosed for a wire stripper machine comprises a first beveled rotary collar on a first side of a shank and a second beveled rotary collar on a second side of the shank having a cutting blade there between. The collars comprise a first clamp and a second clamp of an insulated wire in a complementary V-shaped wire drive wheel. The wire drive wheel comprises a third and a fourth clamp of the wire on inner sides of the V-shaped wire drive wheel and the cutting blade comprises a fifth clamp of the wire in a cutting plane thereof. Shank spacers between the first collar and the rotary cutting blade and between the second collar and the rotary cutting blade add predetermined and incremental spacing options between three of the five clamps in the cutting plane of the insulated wire in the wire stripping machine.

6 Claims, 8 Drawing Sheets

(56) References Cited

U.S. PATENT DOCUMENTS

| | | |
|---|---|---|
| 4,339,967 A | 7/1982 | Greenberg |
| 4,656,893 A | 4/1987 | Hudson |
| 4,809,566 A | 3/1989 | Campanella |
| 4,951,530 A | 8/1990 | Cross |
| 5,050,302 A | 9/1991 | Mills |
| D343,626 S | 1/1994 | Fan |
| 5,445,051 A | 8/1995 | Carpenter |
| 5,542,327 A * | 8/1996 | Schultz ............... H01B 15/006 29/426.4 |
| 5,797,299 A | 8/1998 | Long, Jr. |
| 5,865,085 A * | 2/1999 | Vollenweider ....... H01B 15/006 81/9.51 |
| 5,979,286 A | 11/1999 | Burth |
| 5,988,018 A | 11/1999 | Tolbert et al. |
| 6,018,873 A | 2/2000 | McCellan |
| 6,581,291 B1 | 6/2003 | Tarpill |
| 6,643,448 B1 | 11/2003 | Brewer et al. |
| 7,171,753 B2 | 2/2007 | Korczak |
| 7,360,566 B2 | 4/2008 | Chang |
| 8,459,317 B2 | 6/2013 | Hu |
| 2003/0015080 A1 | 1/2003 | Adams |
| 2003/0196520 A1 | 10/2003 | Locher |
| 2007/0074409 A1 | 4/2007 | Hsu |
| 2010/0319199 A1 | 12/2010 | Mullaney |
| 2011/0010945 A1 | 1/2011 | Delafosse |
| 2012/0167719 A1 | 7/2012 | Newman |
| 2013/0133203 A1 | 5/2013 | Stocklein |
| 2013/0133204 A1 | 5/2013 | McDannall et al. |
| 2014/0215830 A1 | 8/2014 | Ducret |

* cited by examiner

WIRE STRIPPER WITH CLAMPING DEVICE

BACKGROUND OF THE INVENTION

The designer of a wire stripper machine is conventionally faced with 2 major technical requirements: driving an insulated wire through the machine and making a cut on the wire insulation. The two main means of guiding the driving of a wire are an adjustable one-hole (one-hole-fits-all) guide and a nonadjustable hole, or minimally adjustable multiple-hole guide means. Either means may apply to single-entrance wire strippers and multiple-entrance wire strippers. There are also less common strippers that sit in between the two machine types. Although it drives wire better, a multiple-hole type wire stripper machine has disadvantages, such as higher cost, size, and weight. Therefore, there has been a long felt need in the market for an adjustable one-hole stripper machine with improved wire driving performance.

An adjustable, one-hole stripper machine must be able to fit wires ranging from a very small diameter (e.g. 1 mm) to a very large diameter (e.g. 75 mm). Its wire drive wheel must also have good contact with the wire in order to provide sufficient traction and to fix the wire at a desirable location. Typically, instead of the circular shaped opening frequently used in multiple-hole strippers, a V-shaped wire drive wheel is used in adjustable-hole strippers. The V-shaped wire drive wheel allows wires with any diameter to sit at its center point or trough, directly under the blade. With the blade at an appropriate height, a continuous longitudinal cut can be made as the wire is driven through the stripper machine.

However, one of the main difficulties with the V-shaped wheel is a poor wire retaining capability. In practical application and operation, the wire can often escape from the ideal location in the center line of the V-shaped wheel directly under the blade. The wire may escape when it is not perfectly straight (w/bends and kinks), the wire is thin and soft (easily deforms its shape and gets pushed aside by the blade) and the wire is slippery and/or stiff (higher blade pressure needed), which in turn generates greater side-shoving force when the wire is not centered in the trough. The wire may also escape from the ideal location when the blade is slightly dull and requires greater downward pressure.

FIG. 1 is a close up view of a wire stripper machine common to the prior art, including a rotary cutting blade on a shank and a V-shaped wire drive wheel on a turn crank shaft. The shaded open area shows a wide open possible escape route for the wire in the prior art. As a result, adjustable-hole strippers are typically not well suited for thinner and/or softer wires. A lot of techniques have been tried in the prior art to keep the wire at the center. Some examples are an input plate which restrains the wire at a distance (e.g. 2") from the blade, an input tube which inserts into the hole on the input plate and restrains the wire at a closer distance (e.g. ½") from the blade.

None of the prior art solutions can offer satisfactory results because they don't offer restrictions at the critical plane that is perpendicular to the blade, and includes the blade center and the axis of the V-shaped wheel, where wire escape takes place. Therefore, the long felt need in the market for an adjustable one-hole stripper machine with improved wire driving performance has gone unmet until the Applicant's present disclosure.

SUMMARY OF THE INVENTION

A wire stripper machine clamp device is disclosed. The disclosed device comprises a first beveled collar on a first side of a shank and a second beveled collar on a second side of the shank having a cutting blade there between, the first and the second beveled collars comprising a first and a second clamp of an insulated wire in a complementary V-shaped wire drive wheel. The wire drive wheel comprises a third and a fourth clamp of the wire on inner sides of the V-shaped wheel and the cutting blade comprises a fifth clamp of the wire in a cutting plane thereof.

An embodiment of the present disclosure includes the first beveled collar and the second beveled collar being rotary and the cutting blade there between to also be rotary and coaxial with the first and second beveled collars. Additionally, a plurality of shank spacers are included between the first beveled rotary collar and the rotary cutting blade and a plurality of spacers between the second beveled rotary collar and the rotary cutting blade to accommodate insulated wires of various thicknesses or diameters. The spacers are configured to add predetermined and incremental spacing options between three of the five clamps in the cutting plane of the insulated wire in the wire stripping machine.

A wire stripper machine clamp device, comprising a first clamp restraint on a first side of a shank and a second clamp restraint on a second side of the shank having a first cutting blade there between on a topside and a second cutting blade there between on a bottom side is also disclosed. The first and the second clamp restraints comprise a first and a second clamp of an insulated wire in a cutting plane thereof and the first and the second cutting blades comprise a third and a fourth clamp of the insulated wire in the cutting plane spaced equidistantly apart.

Other aspects and advantages of embodiments of the disclosure will become apparent from the following detailed description, taken in conjunction with the accompanying drawings, illustrated by way of example of the principles of the disclosure herein.

Figure 1:
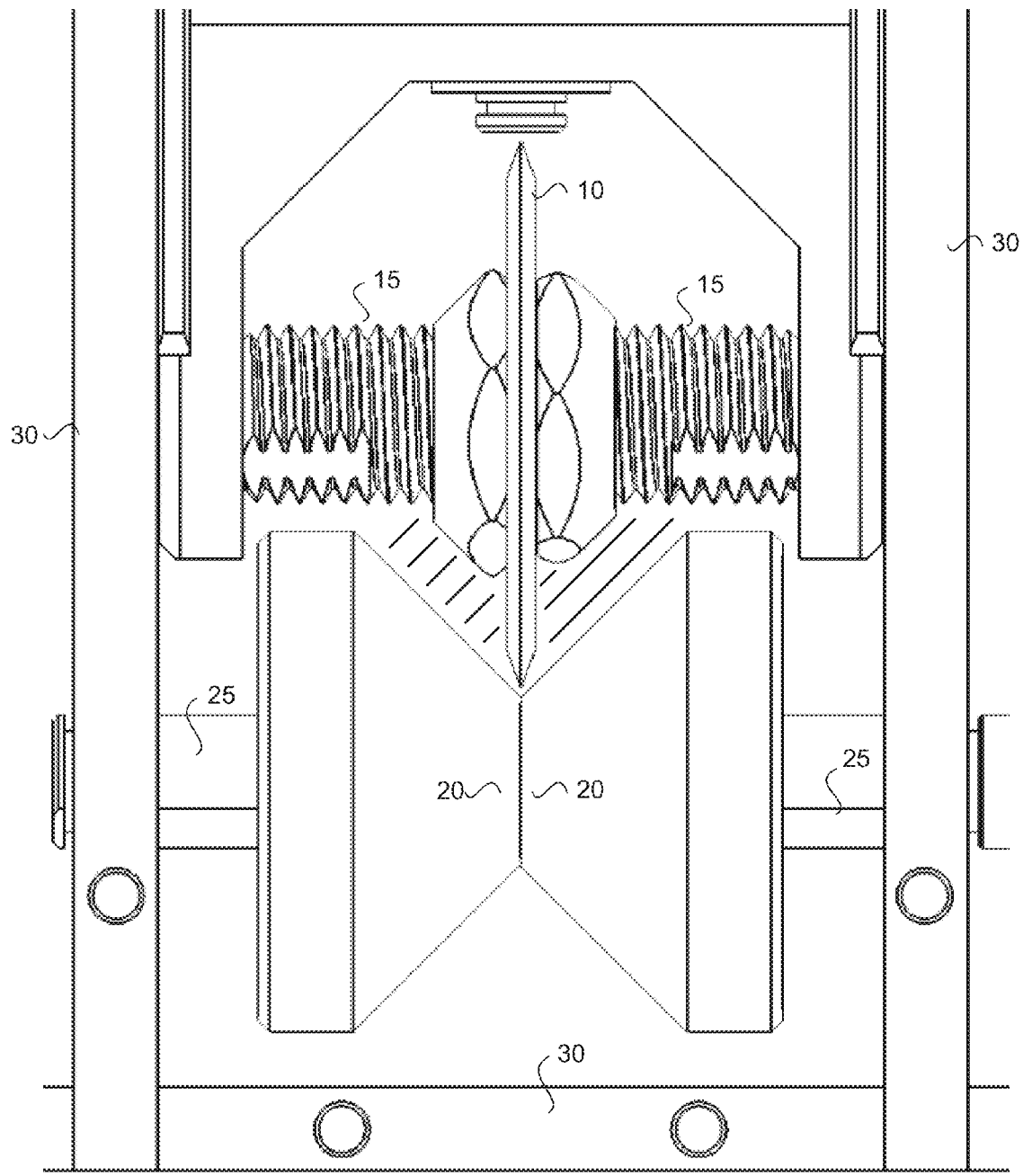
FIG. 1 is a close up view of a wire stripper machine common to the prior art, including a rotary cutting blade on a shank and a V-shaped wire drive wheel on a turn crank shaft.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

FIG. 1 is a close up view of a wire stripper machine common to the prior art, including a rotary cutting blade on a shank and a V-shaped wire drive wheel on a turn crank shaft. The prior art includes the rotary cutting blade 10, the shank 15, the V-shaped wire drive wheel 20, the turn crank shaft 25, and the surrounding body structure 30. The cross hashed area between the cutting blade and the V-shaped wire drive wheel is termed herein the wire escape area. A wire (undepicted) placed in the trough of the wire drive wheel 20 and underneath the cutting blade 10 may jump or skip and escape from the trough during cutting due to knots, kinks or other obstructions in the wire or the insulation. Once a wire jumps from the trough, an operator must take the time to reposition the wire and lost productivity results.

The stripper machine may lower the cutting blade via lowering the shank to which the blade is attached. The crank handle is then used to turn the wire drive wheel and pull an insulated wire there through while cutting the insulation along a lateral dimension of the wire. Smaller diameter wires will require further lowering of the shank toward the wire drive wheel while larger diameter wires require less lowering of the shank and therefore more escape area is available to the wire in the prior art.

Figure 2:
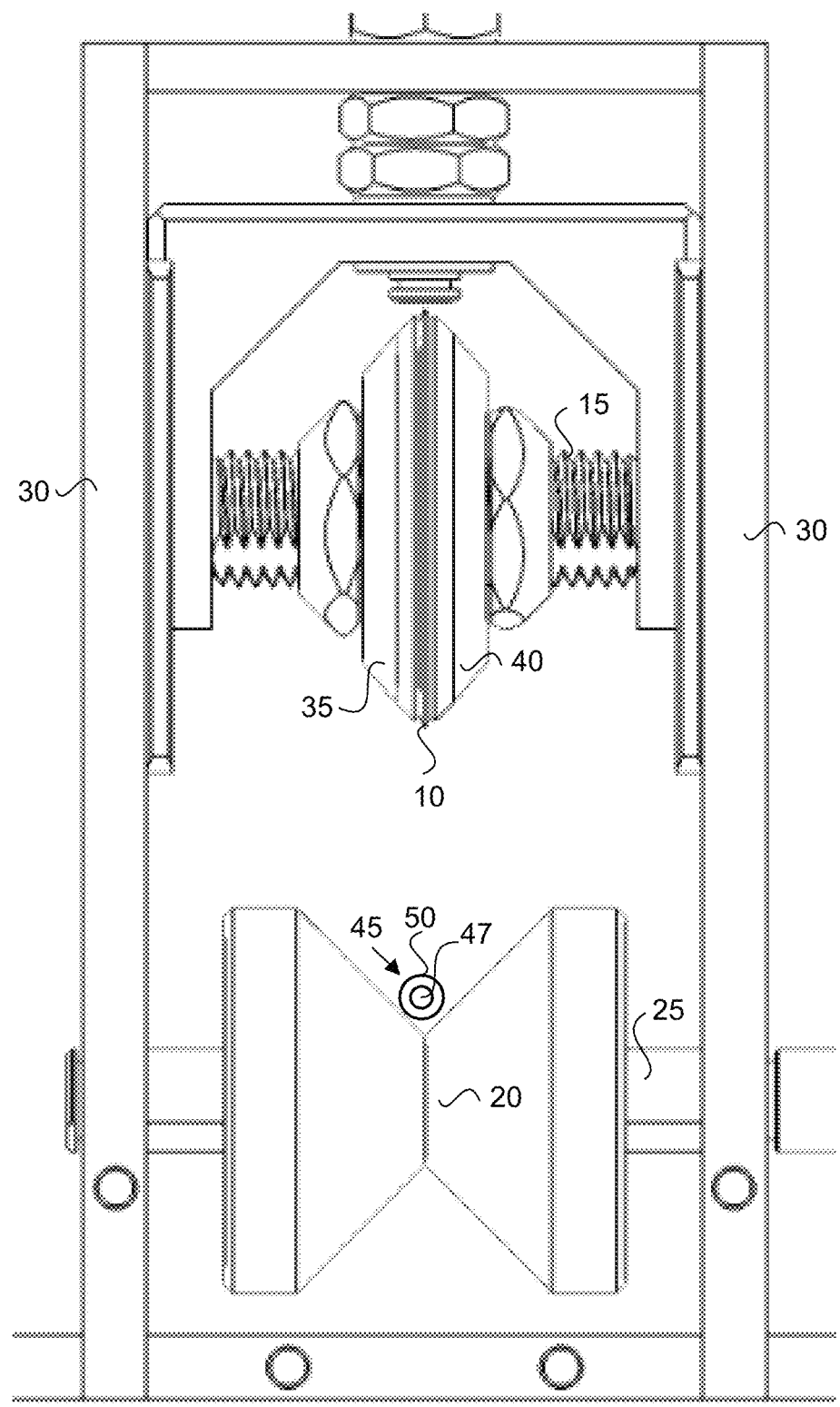
FIG. 2 is a front elevational view of a wire stripper machine comprising a pair of beveled rotary collars configured to clamp an insulated wire in the V-shaped wire drive wheel according to an embodiment of the present disclosure.

FIG. 2 is a front elevational view of a wire stripper machine comprising a pair of beveled rotary collars configured to clamp an insulated wire in the V-shaped wire drive wheel according to an embodiment of the present disclosure. The disclosed device comprises a first beveled collar 35 on a first side of a shank 15 and a second beveled collar 40 on a second side of the shank 15 having the cutting blade 10 there between. The first and the second beveled collars 35 and 40 comprise a first and a second clamp of a wire insulation 50 in the complementary V-shaped wire drive wheel 20. The wire drive wheel 20 comprises a third and a fourth clamp of the wire 45 on inner sides of the V-shaped wire drive wheel 20 and the cutting blade 10 comprises a fifth clamp of the wire 45 in a cutting plane thereof. The metal core 47 of the wire 45 is enclosed laterally by the insulation 50 depicted in the wire drive wheel 20. Therefore the present disclosure comprises a pair of objects or clamps 35 and 40 on either side of the cutting blade 10 at the critical plane, plugging the space between the cutting blade 10 and the V-shaped wire drive wheel 20. When properly made and applied, the escape route can be reduced to near zero by the disclosed clamp device.

An embodiment of the present disclosure includes a pair of rotary wire clamps 35 and 40 attached to each side of the blade 10. The rotary wire clamps 35 and 40 are fastened onto a shank 15 and rotate with the blade 10 and are coaxial with the blade 10 also on the shank 15. The wire clamps 35 and 40 also travel up and down with the blade 10 for differing diameters of insulated wires inserted into the wire stripper machine. Therefore, the long felt need in the market for an adjustable one-hole wire stripper machine with improved wire driving performance has finally been met in each and every aspect by the Applicant's present disclosure.

By choosing the right shape and diameter of wire clamps, an insulated wire can be confined by five points (prior art only has three points) at the critical plane where the cut of the insulation is made. Four of the five points are planar contacts as opposed to point contact at the blade edge. The wire therefore becomes literally and totally confined or clamped at the stripping point and has a very little chance to escape. A reliable cut, even on previously difficult wires, can now be made quickly, consistently and reliably.

Figure 3:
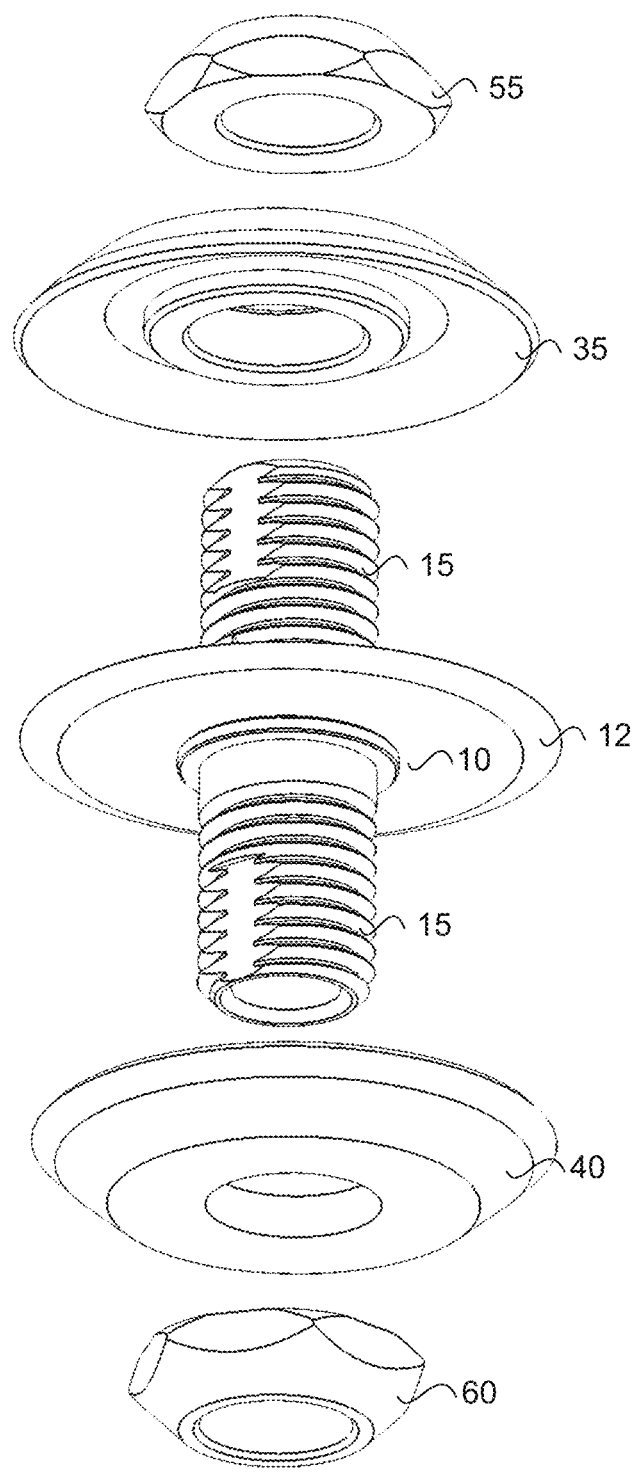
FIG. 3 is an exploded view of the wire stripper machine clamp device in accordance with an embodiment of the present disclosure.

FIG. 3 is an exploded view of the wire stripper machine clamp device in accordance with an embodiment of the present disclosure. The exploded view includes the rotary cutting blade 10, the shank 15, the beveled rotary collar clamps 35 and 40 and the retaining nuts 55 and 60. The beveled rotary collar clamps 35 and 40 may also be threaded so that the retaining nuts 55 and 60 are not necessary. The hexagonal edges of the retaining nuts 55 and 60 may preclude them from acting as beveled rotary collar clamps. The first and the second beveled collars 35 and 40 are configured to allow only a cutting edge 12 of the cutting blade 10 to protrude from the first and the second beveled collars 35 and 40 and penetrate an insulation 50 of the insulated wire 45 enough to touch a metal core of the wire 47 and allow complete stripping thereof.

Figure 4:
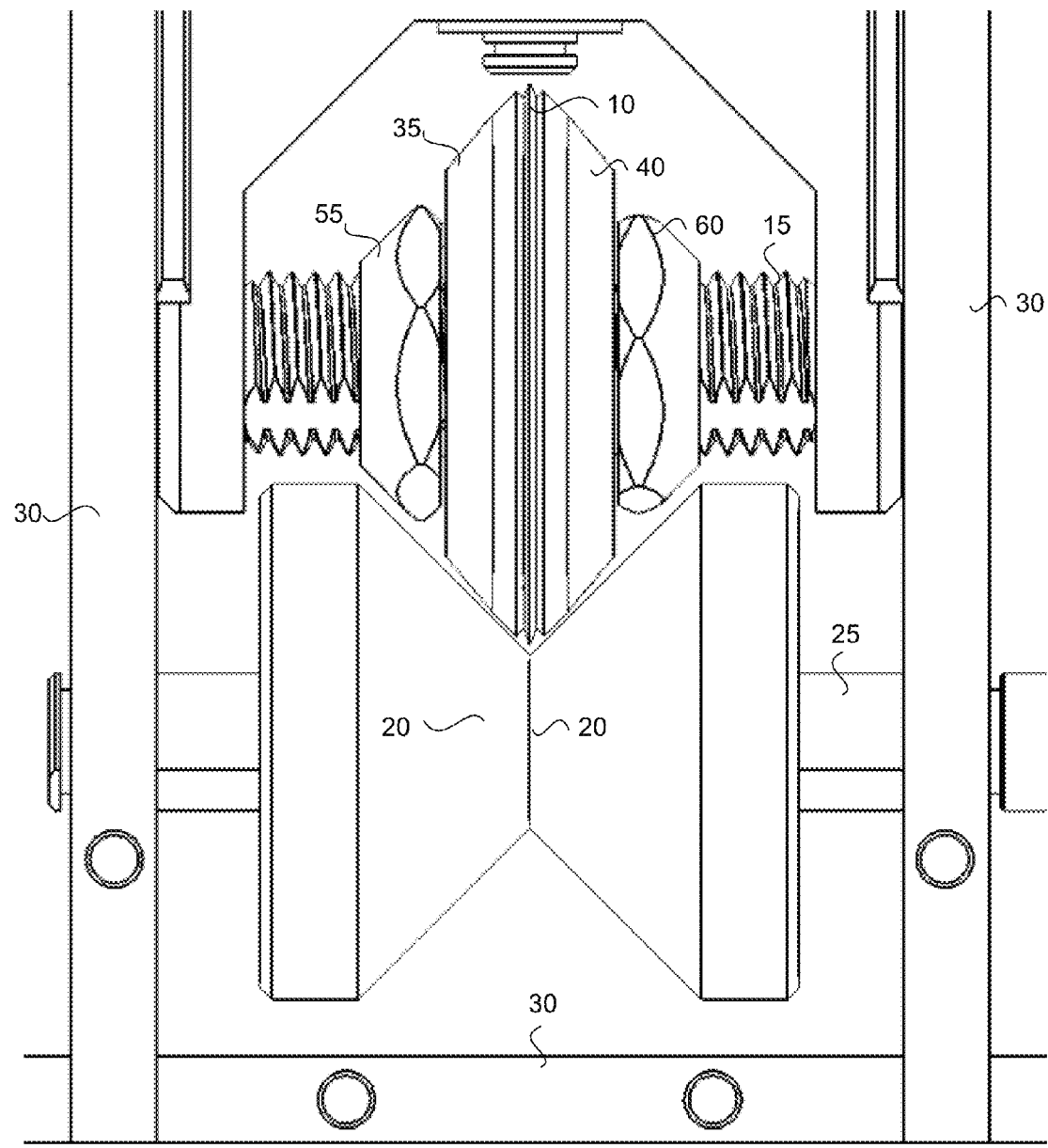
FIG. 4 is a close-up view of the stripper machine clamp device immediately adjacent to the wire drive wheel in accordance with an embodiment of the present disclosure.

FIG. 4 is a close-up view of the stripper machine clamp device immediately adjacent to the wire drive wheel in accordance with an embodiment of the present disclosure. Depicted are the rotary cutting blade 10, the shank 15, the beveled rotary collar clamps 35 and 40, and the retaining nuts 55 and 60. The complementary angles of the beveled rotary collar clamps 35 and 40 to the V-shaped wire drive wheel 20 are clearly shown. Therefore an insulated wire 45 between the wire drive wheel 20 and the cutting blade 10 is further constrained by the rotary collar clamps 35 and 40.

Figure 5:
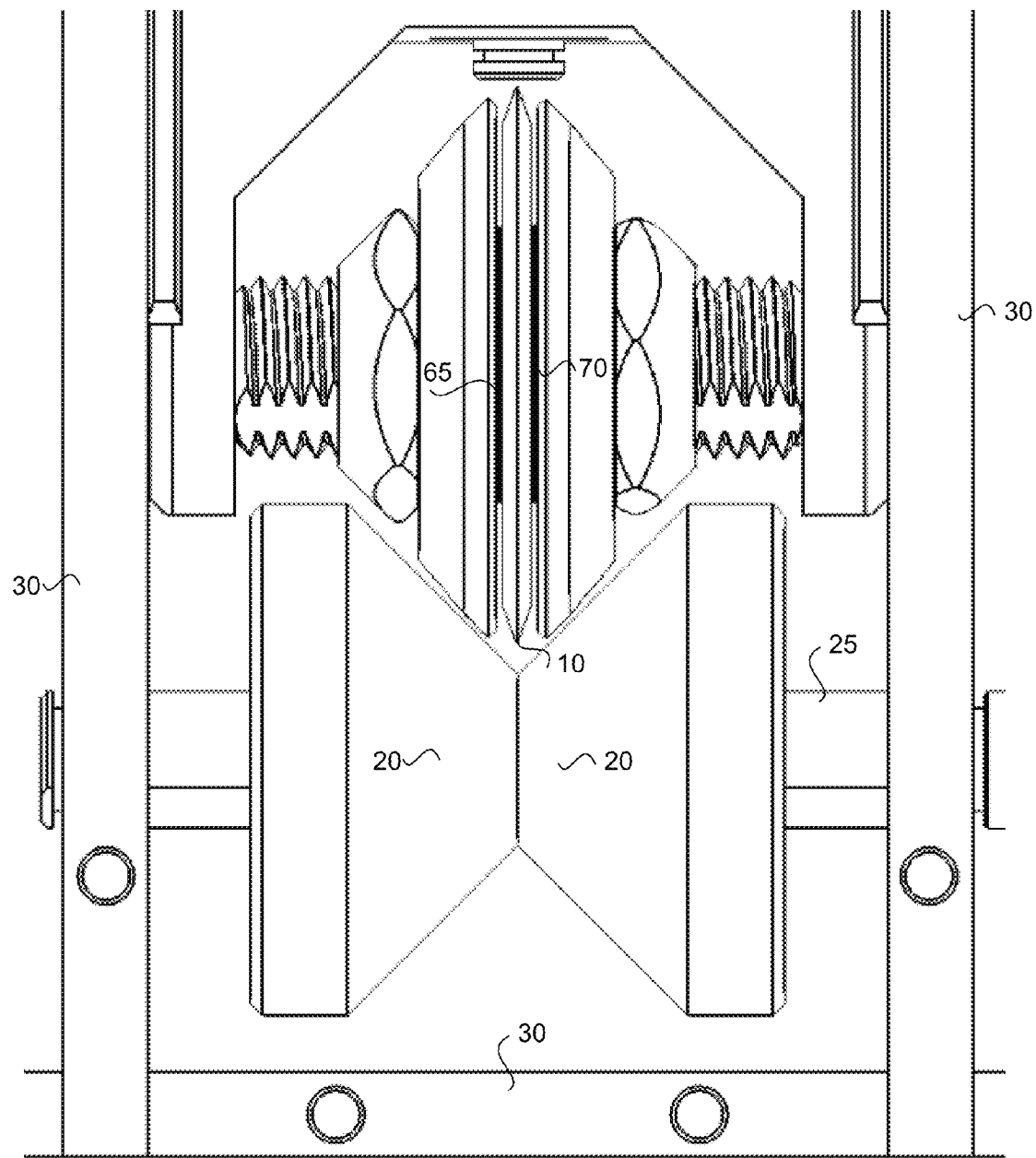
FIG. 5 is a close-up view of the stripper machine clamp device comprising a spacer between each beveled rotary collar clamp and the cutting blade in accordance with an embodiment of the present disclosure.

FIG. 5 is a close-up view of the stripper machine clamp device comprising a spacer between each beveled rotary collar clamp and the cutting blade in accordance with an embodiment of the present disclosure. Features and reference numbers depicted in other figures in the present disclosure are the same or similar to the features and reference numbers depicted or undepicted herein. In order to make the wire clamp effective on a large range of wire diameters, two things may be done. One, a number of flat washers (e.g. 0.5 mm thick each) 65 and 70 may be added between the cutting blade 10 and the wire clamps 35 and 40, spreading the clamps 35 and 40 apart by keeping the cutting blade 10 at the middle of the escape route. By adding the correct number of predetermined washers 65 and 70 and setting the cutting blade 10 at the correct height, the wire clamps 35 and 40 may work on a large range of wire diameters. Often times, two pairs (or even one pair) of wire clamps can meet the needs of confining all wire sizes previously unstable to pass the stripper machine. Two cutting blades of different sizes may be offered. As the washers 65 and 70 are added and the blade is raised to fit thicker wires, sometimes the cutting blade 10 can no longer cut deep enough into the insulation, especially for wires with thicker insulation. A cutting blade with a larger diameter can be used with the same wire clamps 35 and 40. This keeps the number of required wire clamps low. Having extra cutting blades is more economical than having more wire clamps. There are a couple of reasons for this. One, a cutting blade is typically cheaper than a pair of clamps. Two, the extra cutting blade can also be used as a spare blade on thicker wires that don't require clamping, saving the cost of buying spare blades for larger wires.

There is also an additional benefit of using clamps when compared to using devices of prior art to strip thin wires. The cutting blade needs to be set so low that sometimes it cuts on the V-shaped wheel, resulting in major damage to both parts. The disclosed clamping devices are designed such that when they are in contact with the V-shaped wheel, the blade tip still has some distance from the surface of the wheel. Since the contact area shared by the clamps and the wire drive wheel is much larger, serious damage is not likely in the event that the cutting blade is accidentally set too low by the operator. Therefore, the blade will never be able to cut on the V-shaped wheel. In other words, the clamps 35 and 40 are configured to allow only a cutting edge of the cutting blade to protrude from the clamping collars.

Figure 6:
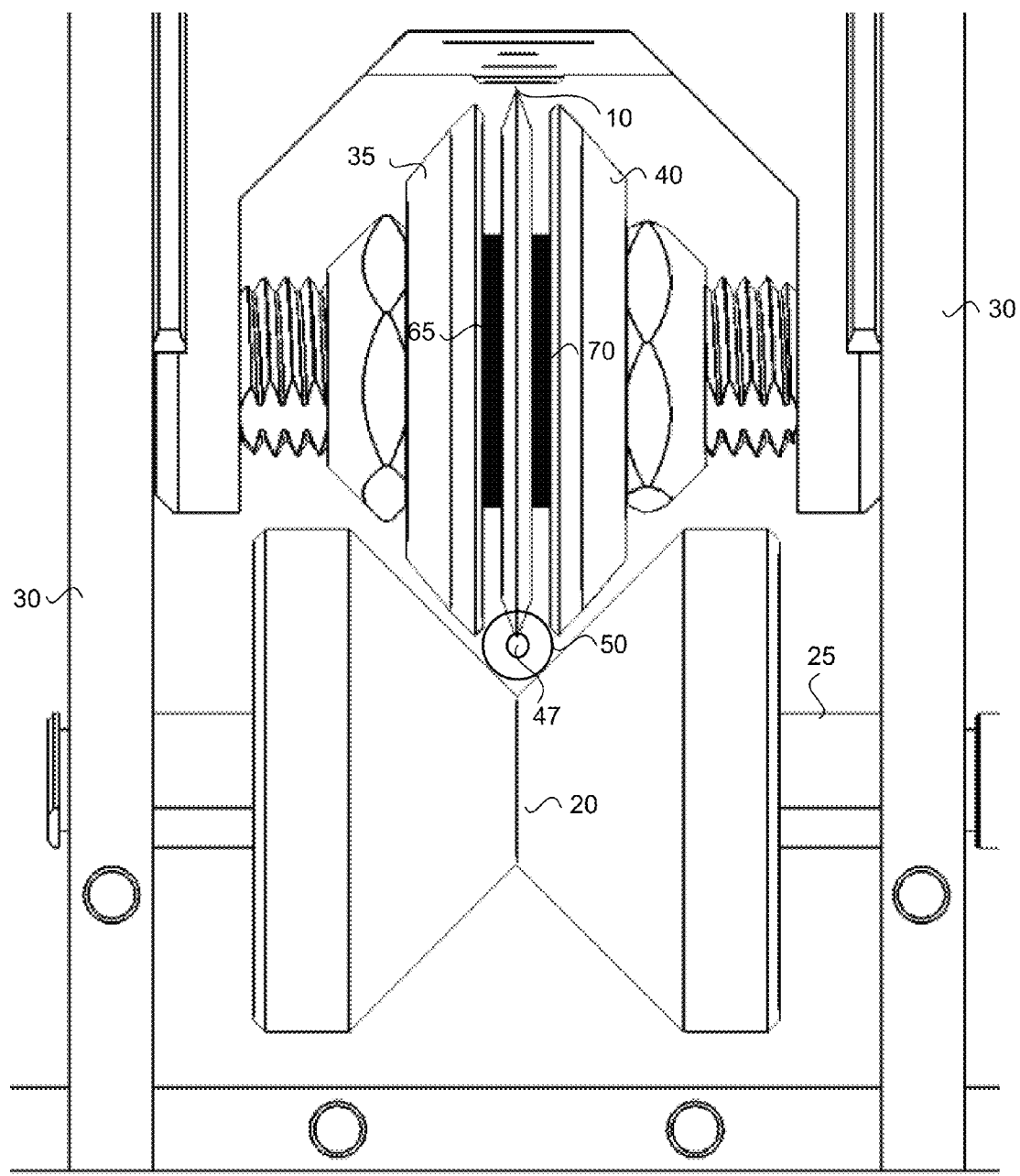
FIG. 6 is a close-up view of the stripper machine clamp device comprising multiple spacers between each beveled rotary collar clamp and the cutting blade in accordance with an embodiment of the present disclosure.

FIG. 6 is a close-up view of the stripper machine clamp device comprising multiple spacers between each beveled rotary collar clamp and the cutting blade in accordance with an embodiment of the present disclosure. The disclosed device includes a plurality of shank spacers 65 and 70 between the first beveled rotary collar and the rotary cutting blade and a plurality of spacers 65 and 70 between the second beveled rotary collar and the rotary cutting blade. The spacers 65 and 70 add a plurality of spacing options between three of the five clamps in the cutting plane of the insulated wire in the wire stripping machine. The cutting blade 10 pierces the insulation 50 of the wire 45 to the metal core 47 as the insulation is clamped by the rotary collars 35 and 40 holding the wire directly under the blade 10. It is also clearly depicted that the cutting edge 12 of the cutting blade 10 protrudes only enough to cut the insulation but not enough to damage the wire drive wheel 20.

Figure 7:
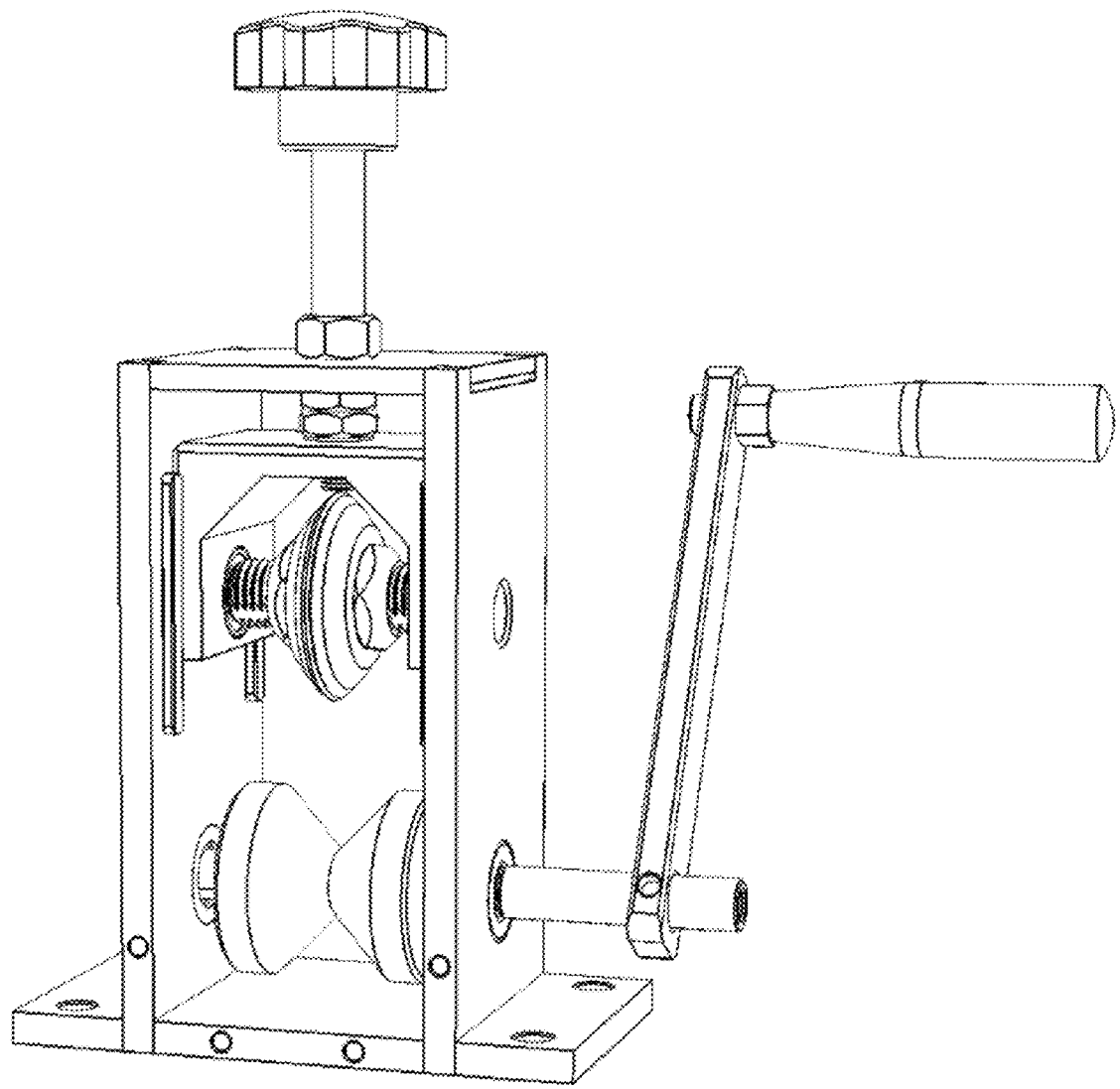
FIG. 7 is a perspective view of the stripper machine clamp device in accordance with an embodiment of the present disclosure.

FIG. 7 is a perspective view of the stripper machine clamp device in accordance with an embodiment of the present disclosure. Reference numbers for features of FIG. 7 may be the same or similar to reference numbers used to call out same or similar features in the other figures herein. The disclosed wire clamp device is seamless and perfectly integral with the prior art wire stripper machine at minimal cost and operative convenience.

In another embodiment of the present disclosure, a pair of stationary metal sticks, rods or even cylinders is extended from the stripper machine to intersect with the insulated wire in the critical plane. The pair of stationary sticks doesn't have contact with the blade or the V-shaped wheel. Their positions can be adjusted based on the wire size. Given a V-shaped wheel that has a 90° angle, each stick is about 22.5° to the blade direction (vertical direction) or about half the angle between the blade and the slope surface on the V-shaped wheel in the cutting plane. The sticks can be adjusted in two directions: 0° to the blade (vertically) and 22.5° to the blade or about half the angle between the blade and the slope surface on the V-shaped wheel. In other words, each clamp restraint is adjustable in two directions from a midpoint of 22.5° between the blade and a side of the V-shaped wire drive wheel to 0° from the cutting blade and 0° from the V-shaped wire drive wheel. Therefore, a properly adjusted wire will be confined by 5 points in the critical plane. Multiple pairs of metal sticks with different thickness can also be provided. Thicker sticks may work better on much thicker wires. An end of each first and second clamp restraint sticks may comprise a concave surface complementary to a convex outer circumferential surface of an insulated wire in order to best restrain the wire. A first and a second cutting blade may be positioned 180° in opposition to each other in one of a vertical and a horizontal direction.

In yet another embodiment of the present disclosure, some wire strippers use a pair of blades to drive the wire and make two opposing cuts on the insulation. This embodiment has the advantage of letting the copper fall out of the insulation automatically without operator assistance, therefore saving time.

Figure 8:
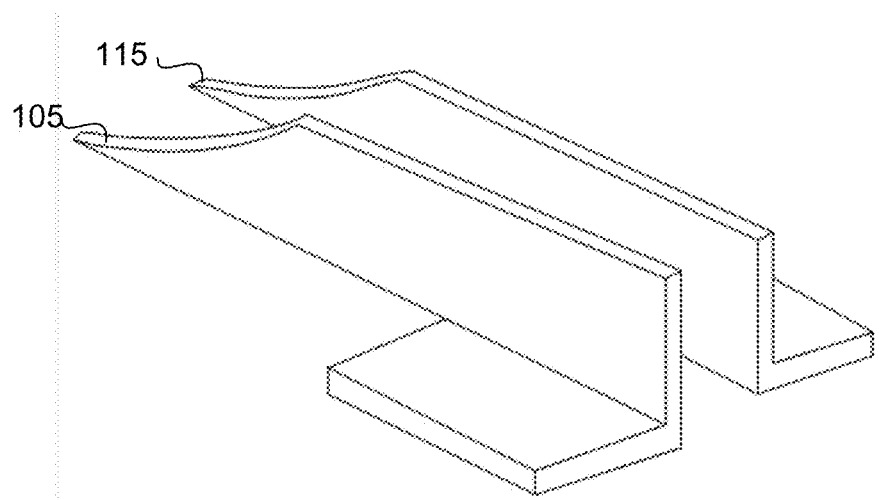
FIG. 8 depicts a pair of stationary horizontally positioned guards arranged on the critical plane on either side of an insulated wire in accordance with an embodiment of the present disclosure.

FIG. 8 depicts a pair of stationary horizontally positioned guards arranged on the critical plane on either side of an insulated wire in accordance with an embodiment of the present disclosure. The width of the plates 105 and 115 can be adjusted to suit the wire size. When the upper blade is raised to allow thicker wire, the pair can be raised to track the center of the wire, too. The pair can also have a third moving direction. They can be pushed further toward the blade, allowing its wider section, which has higher strength, to clamp thick wires.

Figure 9:
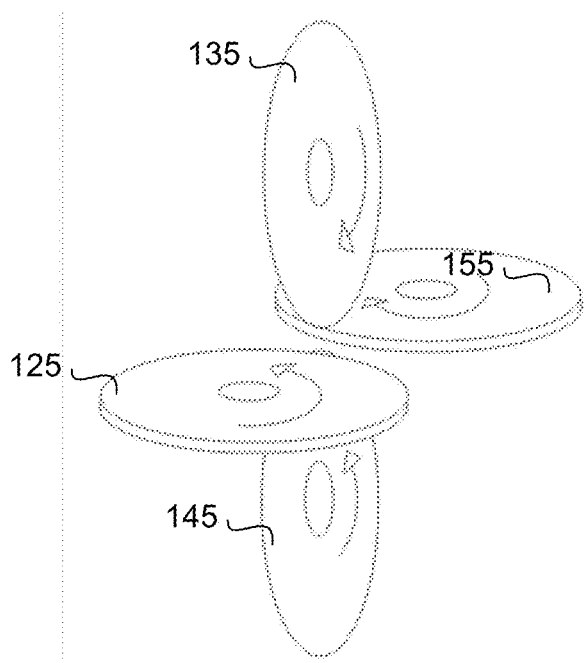
FIG. 9 depicts a pair of rotating circular plates in a horizontal and a vertical position configured to help move the insulated wire through the stripper machine in accordance with an embodiment of the present disclosure.

FIG. 9 depicts a pair of rotating circular plates in a horizontal and a vertical position configured to help move the insulated wire through the stripper machine in accordance with an embodiment of the present disclosure. The plates 125, 135, 145 and 155 can be powered or free-rotating. The horizontal and vertical position of the plates can be independently adjusted to fit various wire sizes. This embodiment has the advantage of less friction between the plates and the wire than the aforementioned position guards. Its other advantage is being able to drive the plates and help move the wire through the stripper machine.

An additional embodiment of the present disclosure includes a series of fabricated blades. Each blade is machined or fabricated as one piece. The profile of the blades achieves three clamping points. The fabricated blades therefore have the same or a similar profile at the critical plane as the profile the wire clamps achieve at the critical plane.

The present disclosure may be used on many types of wire strippers, i.e. manual or powered, rotating blade or stationary blade types. The present disclosure may also be used on an adjustable-hole wire stripper. The present disclosure satisfies the long felt need in the market place for an adjustable one-hole stripper machine with improved wire driving performance.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents to be included by reference in a non-provisional utility application.

What is claimed is:

1. A wire stripper with clamping device, comprising:
   a first beveled collar on a first side of a shank and a second beveled collar on a second side of the shank, the first and second beveled collars forming first and second clamping elements respectively, each of the first and second beveled collars including a beveled surface that substantially spans a width thereof;
   a cutting blade located between the first and second beveled collars, the first and second beveled collars together with the cutting blade forming a V-shaped configuration with the blade defining the apex of the V; and
   a V-shaped wire drive wheel comprising a third clamping element and a fourth clamping element on inner sides of the V-shaped wire drive wheel, the cutting blade being configured so as to function as a fifth clamping element, and being oriented in a cutting plane that is perpendicular to the shank and passes through a vertex center of the V-shaped wire drive wheel,
   wherein the V-shaped configuration and the V-shaped wire drive wheel are arranged such that their respective apexes are oriented and are pointing in the same direction whereby said arrangement offers restrictions at a critical plane that is perpendicular to the cutting blade, thereby reducing wire escape.

2. The wire stripper with clamping device of claim 1, wherein the first beveled collar and the second beveled collar are both rotary, and the cutting blade there between is also rotary and coaxial with the first and second beveled collars on the shank.

3. The wire stripper with clamping device of claim 1, further comprising at least one spacer between the first beveled collar and the cutting blade and at least one spacer between the second beveled collar and the cutting blade, the spacers being configured to add space between three of the five clamping members.

4. The wire stripper with clamping device of claim 1, further comprising a plurality of shank spacers insertable between the first beveled collar and the cutting blade and a plurality of spacers insertable between the second beveled collar and the cutting blade, the plurality of spacers being configured to add a plurality of spacing options between the cutting blade and the two beveled collars.

5. The wire stripper with clamping device of claim 1, wherein each of the first and the second clamping elements is adjustable in two directions from a midpoint between the blade and a side of the V-shaped wire drive wheel to 0° from the cutting blade and 0° from the V-shaped wire drive wheel.

6. The wire stripper with clamping device of claim 1, wherein the first and the second beveled collars are configured to allow only a cutting edge of the cutting blade to protrude from between the first and the second beveled collars and penetrate an insulation of an insulated wire clamped between the clamping elements enough to touch a metal core of the wire.

* * * * *